No. 643,885. Patented Feb. 20, 1900.
J. OLIVER.
WHEEL PLOW.
(Application filed May 26, 1899.)
(No Model.) 2 Sheets—Sheet 1.
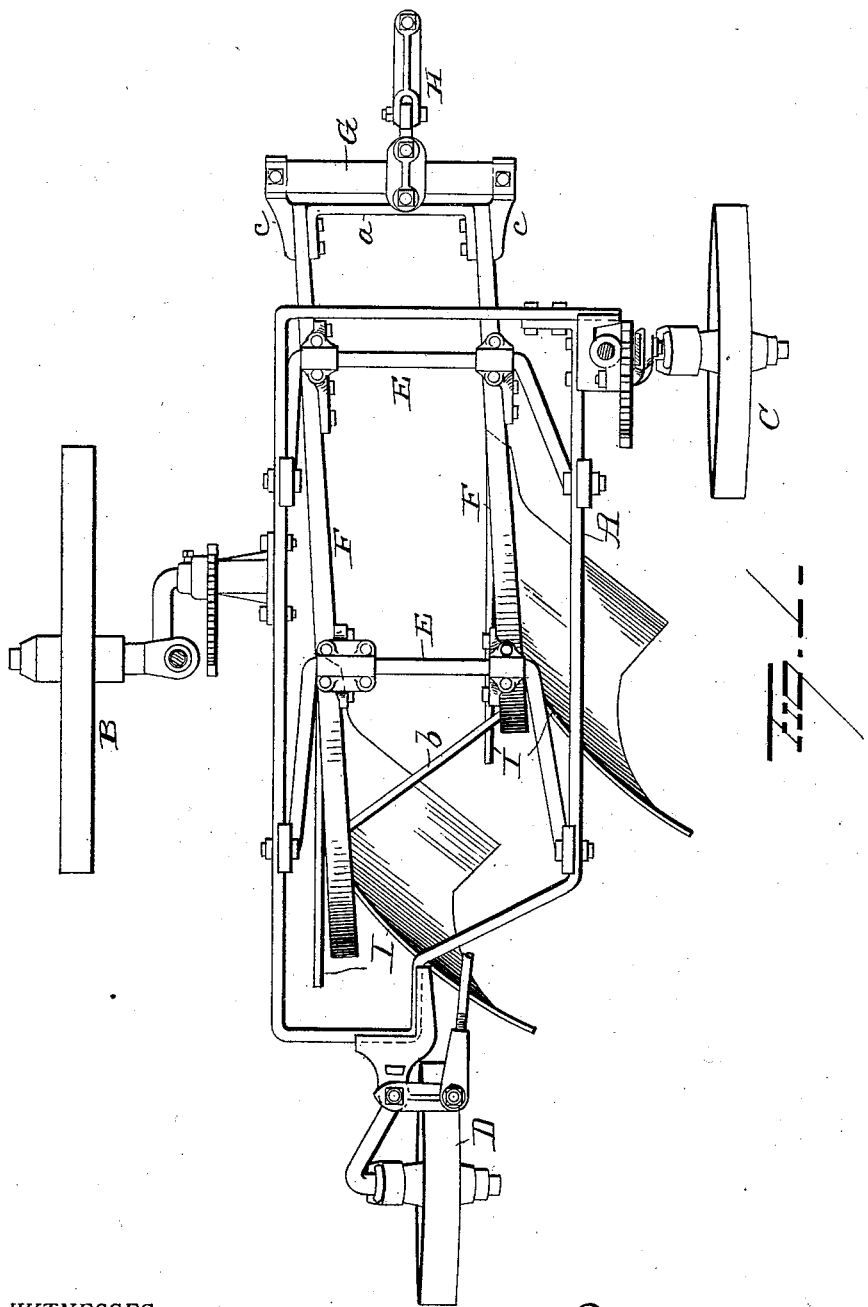

No. 643,885. Patented Feb. 20, 1900.
J. OLIVER.
WHEEL PLOW.
(Application filed May 26, 1899.)
(No Model.) 2 Sheets—Sheet 2.
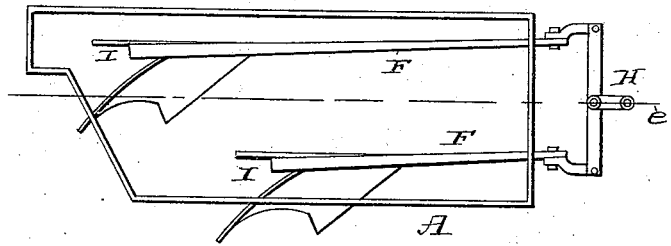
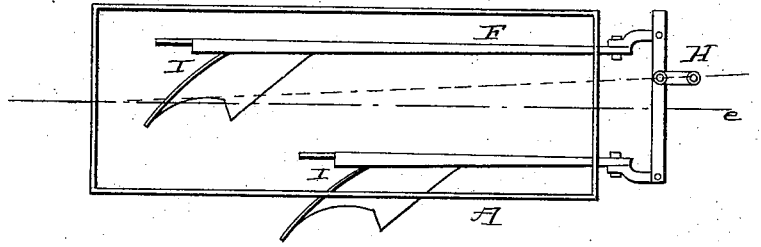
WITNESSES
INVENTOR
James Oliver
Attorney
THE NORRIS PETERS CO., PHOTO-LITHO., WASHINGTON, D. C.

United States Patent Office.

JAMES OLIVER, OF SOUTH BEND, INDIANA, ASSIGNOR TO THE SOUTH BEND IRON WORKS, OF SAME PLACE.

WHEEL-PLOW.

SPECIFICATION forming part of Letters Patent No. 643,885, dated February 20, 1900.

Application filed May 26, 1899. Serial No. 718,357. (No model.)

*To all whom it may concern:*

Be it known that I, JAMES OLIVER, of South Bend, in the county of St. Joseph and State of Indiana, have invented certain new and useful Improvements in Wheel-Plows; and I do hereby declare the following to be a full, clear, and exact description of the invention, such as will enable others skilled in the art to which it appertains to make and use the same.

My invention relates to an improvement in wheel-plows.

In the wheel-plows now in use the plow-beams are parallel with the landsides of the plows and with the carrying-frame, and the attaching-point for a four-horse equalizer falls approximately midway between a central line passing between the two plows and the plow-beam on the landside of the plow, thus causing a side draft on the plows and creating a tendency to tip.

The object of my invention is to obviate wholly or to a large and material extent the side draft on the plows and at the same time equalize the weight of the plows on either side of the center of draft and lessen the tendency to tip and the tendency of the rear caster-wheel to slip away from its work.

With these ends in view my invention consists in the details of construction, as will be more fully described, and pointed out in the claims.

In the accompanying drawings, Figure 1 is a view of a plow embodying my invention. Fig. 2 is a diagrammatic view in plan showing my improvement, and Fig. 3 is a similar representation of the construction as now universally used.

For the purposes of illustrating my improvement I have disclosed it in connection with the gang-plow disclosed in application Serial No. 716,662, filed by Calvin R. Davis May 13, 1899.

The Davis gang comprises a frame A, mounted on land-wheel B, furrow-wheel C, and caster D, the land and furrow wheels being adjustable vertically and the caster-wheel connected by suitable devices with the furrow-wheel, whereby their axles are turned in unison. Supported in the frame A are the parallel bails or hangers E, on which the plow-beams F are pivotally mounted, lifting device and means for locking the plows in their elevated positions being employed, but which have no connection with the present invention, and hence need not be further referred to. The plow-beams F are suitably braced at their front and rear ends by braces *a* and *b* to hold them in their proper relative positions to each other, and in addition to these braces the beams are provided at their front ends with the forwardly-projecting brackets *c*, connected by bars G, to which the clevis H is adjustably secured.

In the plows now in use the beams F rest approximately in a line with the landsides of the plows or bases I and parallel with the sides of the frame A, as shown in Fig. 3, and as the attaching-point for a four-horse equalizer, which is commonly used on a gang-plow, would fall between the central line *e* of frame A and the plow on the land-wheel side of the plow it follows that the uneven pull on the two beams creates a side draft which tends to raise the plow on the side nearest the land-wheel, and thus tip the gang, throw the major part of the weight of the gang on the plow adjacent to the furrow-wheel, and cause the rear caster-wheel to slide away from its work.

My invention consists in setting the plow-beams laterally or obliquely to the landside of the plow and obliquely to the frame A, the inclination of the beams being toward the landside. With this arrangement, as shown in Fig. 2, the ends of the plow-beams to which the clevis is attached rest approximately-equal distances on opposite sides of the hitching-point for a four-horse equalizer, and hence the draft falls equally on and between the two beams without creating any tendency to a side draft and at the same time equalizing the weight on the two plows and lessening the tendency to tip.

Having fully described my invention, what I claim as new, and desire to secure by Letters Patent, is—

1. The combination with a frame mounted on wheels, of bails or hangers pivoted to the frame and a gang of plows carried by said bails or hangers, the plow-beams being arranged obliquely to the frame and to the plows and pointing toward the landside, substantially as set forth.

2. The combination with a frame mounted on wheels, and bails or hangers pivotally secured to said frame, of a gang of plows carried by said hangers, the beams of said plows being arranged obliquely to the landsides of said plows and to the frame and bearing a fixed and unchangeable relation laterally with the sides of said frame, substantially as set forth.

3. In a gang-plow, the combination with a frame mounted on wheels, of a gang of plows mounted in said frame the plow-beams being arranged obliquely to the frame and pointing toward the landside of the plow and connected at their front ends, and a clevis attached approximately centrally to the connection between the front ends of the beams, substantially as and for the purpose set forth.

In testimony whereof I have signed this specification in the presence of two subscribing witnesses.

JAMES OLIVER.

Witnesses:
F. C. NIPPOLD,
EDWIN NICAR.